(12) United States Patent
Näegele et al.

(10) Patent No.: US 8,998,453 B2
(45) Date of Patent: Apr. 7, 2015

(54) CALIBRATION LIGHT SOURCE

(75) Inventors: Thomas Näegele, Wörntzweg (DE);
Detlef Hannak, Markt Schwaben (DE);
Simon Sturm, München (DE)

(73) Assignee: Instrument Systems Optische Meβtechnik GmbH, Munich (DE)

( * ) Notice: Subject to any disclaimer, the term of this patent is extended or adjusted under 35 U.S.C. 154(b) by 102 days.

(21) Appl. No.: 13/322,396

(22) PCT Filed: May 18, 2010

(86) PCT No.: PCT/EP2010/003033
§ 371 (c)(1),
(2), (4) Date: Jan. 17, 2012

(87) PCT Pub. No.: WO2010/136140
PCT Pub. Date: Dec. 2, 2010

(65) Prior Publication Data
US 2012/0140472 A1   Jun. 7, 2012

(30) Foreign Application Priority Data
May 26, 2009   (DE) .......................... 10 2009 022 611

(51) Int. Cl.
*F21V 29/00* (2006.01)
*G01J 3/10* (2006.01)
(Continued)

(52) U.S. Cl.
CPC .. *G01J 3/10* (2013.01); *F21V 29/00* (2013.01); *G01J 1/0252* (2013.01); *G01J 1/08* (2013.01); *G01J 3/0286* (2013.01); *G01J 5/522* (2013.01); *H05B 33/0803* (2013.01)

(58) Field of Classification Search
CPC ....... F21V 17/00; F21V 17/06; F21V 17/101; F21V 19/001; F21V 19/0015; F21V 19/002; F21V 19/003; F21V 19/0035; F21V 19/004; F21V 19/0045; F21V 19/005; F21V 23/06; F21V 29/00; F21V 29/002; F21V 29/004; F21V 29/027; F21V 29/20; F21V 29/22; F21V 29/2218; F21V 29/26; F21V 29/262; F21V 29/265; F21V 29/40; F21V 29/407
USPC ......................... 362/264, 294, 345, 373, 547, 362/249.01–249.02, 362; 62/3.2
See application file for complete search history.

(56) References Cited

U.S. PATENT DOCUMENTS 6,179,465 B1   1/2001   Yam
6,964,501 B2 *  11/2005   Ryan ............................ 362/294
(Continued)

FOREIGN PATENT DOCUMENTS

DE        198 39 088 A1    8/1998
DE      102004035786       7/2004
(Continued)

OTHER PUBLICATIONS

The International Bureau of WIPO, Notification of Transmittal of Translation of the International Preliminary Report on Patentability for International Application No. PCT/EP2010/003033, mail date Dec. 29, 2011, pp. 1-9.
(Continued)

*Primary Examiner* — Jong-Suk (James) Lee
*Assistant Examiner* — Zheng Song
(74) *Attorney, Agent, or Firm* — SoCal IP Law Group LLP; Mark A. Goldstein

(57) ABSTRACT

The invention relates to a calibration radiation source comprising the following: a housing (2) having an opening (12), a board (22) held in the housing (2), a semiconductor radiation source (18) mounted on the board (22) for generating a light beam, and an exit opening support element (14) having, in the area of the opening (12), a light exit opening (15) through which the light beam radiates outwards from the housing (2). The exit opening support element (14) is decoupled from the housing (2), and is attached to the board (22) of the semiconductor radiation source (18).

14 Claims, 2 Drawing Sheets

(51) Int. Cl.
*G01J 1/08* (2006.01)
*G01J 5/52* (2006.01)
*H05B 33/08* (2006.01)
*G01J 1/02* (2006.01)
*G01J 3/02* (2006.01)

(56) References Cited

U.S. PATENT DOCUMENTS

| | | | |
|---|---|---|---|
| 7,111,961 B2 * | 9/2006 | Trenchard et al. | 362/235 |
| 7,628,507 B2 * | 12/2009 | Allen et al. | 362/230 |
| 7,645,056 B1 * | 1/2010 | Mills et al. | 362/294 |
| 2004/0120156 A1 | 6/2004 | Ryan | |
| 2005/0057184 A1 | 3/2005 | Kaneko et al. | |
| 2005/0270776 A1 | 12/2005 | Allen et al. | |
| 2006/0139630 A1 | 6/2006 | Yu et al. | |
| 2006/0255705 A1 | 11/2006 | Young | |
| 2008/0061717 A1 | 3/2008 | Bogner et al. | |
| 2008/0285271 A1 | 11/2008 | Roberge et al. | |
| 2008/0295522 A1 * | 12/2008 | Hubbell et al. | 62/3.2 |
| 2009/0273930 A1 | 11/2009 | Kraus | |

FOREIGN PATENT DOCUMENTS

| | | |
|---|---|---|
| DE | 102004047682 | 9/2004 |
| DE | 102005058884 | 12/2005 |
| DE | 102009022611 | 1/2011 |
| JP | 2000515638 A | 11/2000 |
| JP | 2002101274 A | 4/2002 |
| JP | 2004077123 A | 3/2004 |
| JP | 2005072218 | 3/2005 |
| JP | 2005149943 A | 6/2005 |
| JP | 2007266173 A | 10/2007 |
| WO | WO 03/081127 A2 | 10/2003 |
| WO | 2006101174 A1 | 9/2006 |
| WO | WO 2010/136140 | 12/2010 |

OTHER PUBLICATIONS

World Intellectual Property Organization, International Search Report and Written Opinion for International Application No. PCT/EP2010/003033, mail date Oct. 7, 2010, pp. 1-13.

* cited by examiner

CALIBRATION LIGHT SOURCE

RELATED APPLICATION INFORMATION

This patent claims priority from International PCT Patent Application No. PCT/EP2010/003033, filed May 18, 2010 entitled, "CALIBRATION LIGHT SOURCE", which claims priority to German Patent Application No. 10 2009 000 611.7, filed May 26, 2009 entitled, "CALIBRATION LIGHT SOURCE", which are incorporated herein by reference in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to a calibration light source, in particular using an LED (light emitting diode).

2. Description of the Related Art

The prior art is briefly summarized below.

U.S. 2004/0120156 A1 describes a high-powered spotlight for theatrical lighting or similar in which a thermally conductive board having high-powered LEDs thereon is mechanically coupled to the housing via a thermally isolating support element. The heat generated by the high-powered LEDs passes into the board and is conveyed away into the housing interior by Peltier elements provided in openings in the support element. The board is thermally insulated to prevent thermal back-flow from the inside of the housing to the LEDs and to decouple the LEDs from the housing heat.

U.S. 2008/0285271 describes an illumination source in which dissipation of the heat generated by the LEDs is facilitated by the fact that the inlets into the housing interior are sufficiently large. Thanks to the chimney effect, air convection flow rates through these inlets are high enough to ensure heat exchange into the housing interior.

Calibration light sources are used inter alia for absolute calibration of light or radiation measurement devices such as spectrometers, photometers and radiometers. It is known heretofore that current- and temperature-stabilised reference LEDs may be used as a calibration light source. LEDs are able to emit radiation in the visible, infrared or ultra-violet wavelength range. A semiconductor chip mounted on a circuit board generates the LED radiation. The required wavelengths can be achieved based on the different physical properties of the material used to produce the semiconductor.

One of the key requirements that a calibration radiation source must fulfill is a high degree of stability in spectral radiation distribution and intensity. Hitherto, standard LEDs with a typical operating current of approximately 20 mA have exclusively been used. Constant electrical power $U_F*I_F$ ($U_F$=forward voltage and $I_F$=forward current) provides the uniform luminous power required in order for the LED to be used as a calibration radiation source. As a general rule, a stable current source is used to provide the current $I_F$. The forward voltage $U_F$ which drops across the semiconductor chip is measured at the LED's connectors. Since at constant current $I_F$ the forward voltage $U_F$ of the LED only varies with temperature, by regulating the temperature of the component it is possible to stabilize the forward voltage $U_F$ and hence the luminous output. As a general rule, the operating point at which the LED is operated is approximately 40° C., significantly higher than the ambient temperature. In the case of standard LEDs used hitherto, to maintain a chip temperature of around 40° C. the component has to be heated. Heating elements in the form of heating resistors, heating diodes etc. are usually used to achieve this stabilization. The component, and hence the LED chip, are kept at a constant temperature by measuring the forward voltage $U_F$ and modifying the heating power accordingly. A disadvantage of the aforementioned calibration radiation sources lies in the low luminous power that can be achieved with the standard LEDs used.

To ensure a Lambertian radiation pattern, a diffuser is positioned in front of the LED as a cap. The diffuser is inserted into an exterior housing, which protects the calibration radiation source against ambient effects.

However, the ambient temperature also influences the luminous output and the radiation spectrum (LED color) radiated by the calibration radiation source. Hence in prior-art calibration radiation sources, rapid fluctuations in the ambient temperature cannot be compensated sufficiently quickly even with active temperature control of the LED temperature, which results in undesirable temporal variations in the calibration radiation source's luminous intensity.

The object of the present invention is to provide a temperature-stable calibration light source.

This object is achieved via the subject matter set forth in Claim one. Preferred embodiments are described in the independent claims.

DETAILED DESCRIPTION

Figure 1:
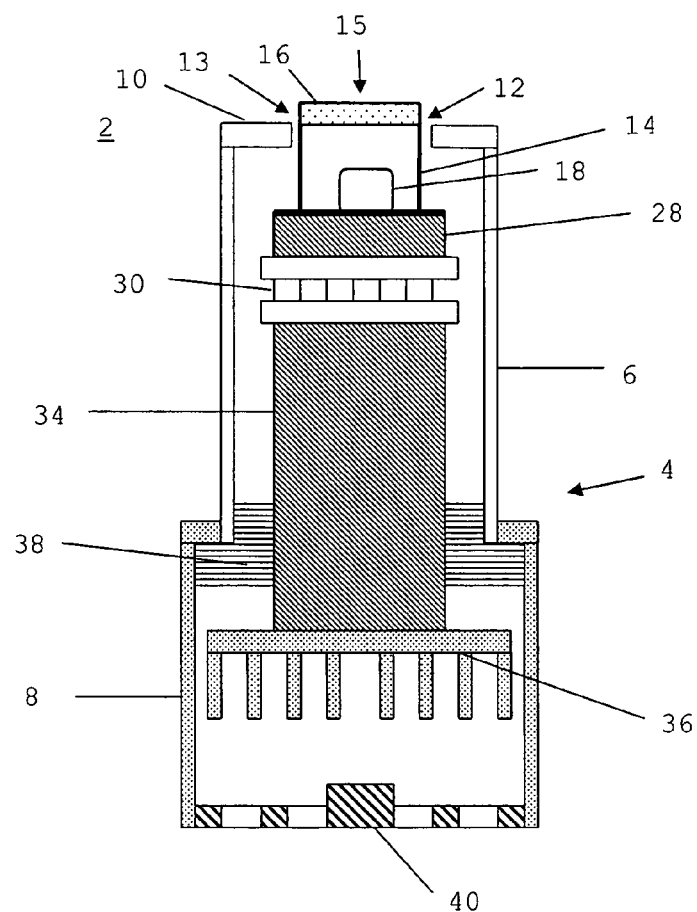
FIG. 1 is a schematic view of a calibration light source according to the invention.

FIG. 1 shows a schematic view of a calibration radiation source 2 according to the invention having an exterior housing 4. The exterior housing comprises front and rear hollow cylindrical housing sections 6 and 8, which are screwed together. The designations 'front' and 'rear' relate to the direction of the light beam radiated out of the housing 4 by the light source. 'Light beam' means a beam in the infrared, visible and ultraviolet range guided for example by a corresponding optical and/or mechanical beam guide. The front housing section 6 is closed off at the front by a circular cover area 10, which has a central opening 12. Through this opening 12 protrudes a rigid exit opening support element 14 having a preferably closed, tubular sidewall (and if necessary a reflective inside wall) and a front light exit opening 15 through which the light beam generated by the light source exits. The rear, open end of the support element 14 is attached to a board 22 for a high-powered LED 18, in which LED 18 is held.

In the exemplary embodiment shown in FIG. 1, a diffuser 16 is positioned in light exit opening 15. The diffuser 16 is a volume scatterer (by contrast with a surface scatterer), which radiates the light outwards as homogeneously as possible in all spatial directions, preferably with a Lambertian radiation pattern. Calibration guidelines set forth requirements regarding the radiating surface of the diffuser 16. In other exemplary embodiments (not shown), the light exit opening 15 may also be open or covered by some other material transparent to the light beam (e.g. a glass pane for a beam in the visible wavelength range). The diffuser 16, the open hole (or its frontal internal edge) or the transparent material define a specified aperture for the exiting light beam, at a fixed distance from the high-powered LED 18, and thus influence the radiation characteristics of the calibration radiation source. Further optical elements may be located in the beam path between the semiconductor light source 18 and the light exit opening 15.

The high-powered or high-current LED 18 is a semiconductor light source having a high power supply (typically at least 1 watt at an operating current of at least 350 mA and a chip edge length of for example 1 mm) which can generate a beam of several lumens, as compared with only a few tens of millilumens with conventional LEDs. The high-powered LED 18 is preferably used with the goal of providing sufficient luminous power to allow calibration of light meters and radiometers. However, the electrical power supplied, in particular in the case of high-powered LEDs, is only partly converted into light; the rest has to be conveyed away as heat. The significantly higher power densities of high-powered LEDs make it necessary to actively or passively cool the component. Furthermore, it is no longer possible to stabilize the LED by providing further heat.

The exterior housing 4 and the support element 14 are made of a material having very low thermal conductivity (for example a suitable plastic). The diffuser 16 may be made of sintered quartz glass, which is for example adhesively bonded into the plastic material of the support element 14. Instead of or in addition to diffuser 16, an optically transparent window (not shown) made of glass, quartz or some other optically transparent material may be provided in light exit opening 15. In the type of embodiment shown, the support element 14 holding diffuser 16 protrudes slightly forward from opening 12; alternatively, it may end flush with cover area 10. Between the cylindrical exterior wall of the support element 14 and the circular inner edge of the opening 12, a small annular gap 13 is provided, so that the inner edge is not in contact with the support element 14. The annular gap 13 may for example be filled or sealed off by a flexible silicon seal, in order to seal off the interior of the exterior housing 4 against external influences. Aside from this, the support element 14 does not directly connect or touch the exterior housing 4, to avoid transfer of for example heat-related longitudinal changes. That is, the support 14 penetrates exterior housing 4 without touching the housing 4 and can move freely relative to the exterior housing 4. In this way, the support element 14 is mechanically decoupled from the exterior housing 4. The annular gap 13 defines a distance between the exterior housing 4 and the support element 14, which is filled with a thermally insulating air buffer (if necessary, the empty space in the annular gap may also be filled with some other thermally insulating material, provided the mechanical decoupling and free movement are guaranteed so that the forces exerted by the exterior housing 4 on the support element 14 are negligible). This distance is dimensioned at least so that for example longitudinal changes in the exterior housing 4 due to fluctuations in the ambient temperature do not have any effect on the support element 14, and hence the support element 14, along with the high-powered LED 18 coupled to it, remain mechanically clear of the exterior housing 4.

This mechanical decoupling ensures that light exit opening 15 is at a constant distance from semiconductor light source 18, and hence the luminous flux radiated by the latter also remains constant. Thus the distance from light exit opening 15 to semiconductor light source 18 defines the exit angle for the light beam exiting from the opening 15, and thus also defines the luminous flux exiting from the opening 15. Obviously support element 14 is indirectly suspended from exterior housing 4, as described in detail below. Hence the mechanical decoupling relates only to avoiding direct mechanical coupling and the associated direct transfer of force between these two elements, particularly in the event of temperature changes.

Figure 2:
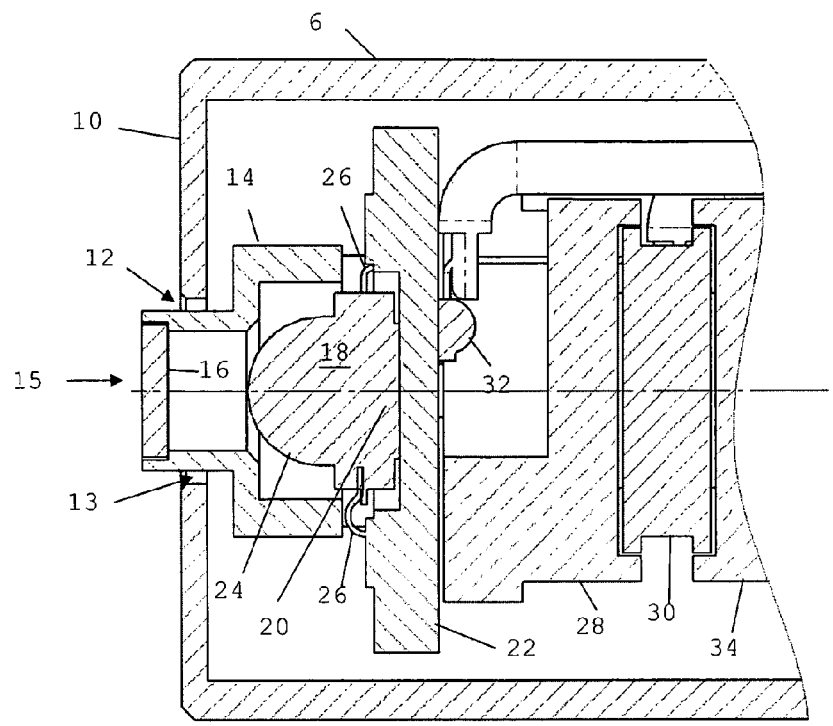
FIG. 2 is an enlarged section from FIG. 1, in the area surrounding the high-powered LED.

In the enlarged section shown in FIG. 2, the structure and mounting of high-powered LED 18 are shown in greater detail. The LED chip 20 rests on a special thermally conductive board 22, e.g. a metal core circuit board or ceramic board. A lens 24 may be provided on the LED chip 20, which bundles the generated light in the direction of the diffuser 16 and the light exit opening 15. Bonding wires 26 electrically connect the LED chip 20 to the board 22, from which connectors (not shown) lead to an electrical power connector (not shown) of calibration radiation source 2. Support element 14 is directly attached, via adhesive bonding of its lower end, to the upper side of the board 22. Alternatively, it may be indirectly attached to board 22, with the inner edge of its lower end laterally attached to the lens 24 or to the LED chip 20, or indirectly attached to board 22 in some other way. Its main purpose is to ensure that a constant distance is maintained between the lens 24 (or the LED chip 20 if no lens 24 is provided) and light exit opening 15, because this distance influences the luminous flux and luminous intensity of the calibration radiation source 2.

Since the power density of the high-powered LED 18 is twenty to fifty times greater than normal LEDs, the contact resistances at the bonding wire 26 may change. As a result, in some cases the forward voltage, which is usually used as the power supply for the high-powered LED 18, and which is measured via the electrical connectors of the high-powered LED 18, is not suitable as a control variable for stabilizing the high-powered LED 18. The temperature is used as the control variable, as described in detail below, and is stabilized to a constant value. At constant supply current, the drop of the forward voltage across the p/n junction of the LED chip 20 also remains constant, and the electrical and optical output (the luminous intensity emitted and the radiation spectrum) of the high-powered LED 18 are therefore stabilized. The forward voltage $U_F$ is a function of the temperature and the current $I_F$. A typical temperature coefficient for the forward voltage at constant current is around −1.5 to −2.5 mV/K. Thus at higher temperatures and constant current $I_F$ the forward voltage is lower. Hence the luminous output decreases as the chip temperature of the LED chip 20 increases. In addition, its radiation spectrum (color) also changes.

The aforementioned temperature stabilization serves as heat protection for the high-powered LED 18. At electrical power of several watts (e.g. 5 W at 2 A maximum operating current), the high-powered LED 18 generates high luminous efficiency and increased dissipated energy, and hence the LED chip 20 heats up significantly. This dissipated energy must be conveyed away, in order to prevent shortening of the working life of or even destruction of the LED chip 20.

Temperature control for the LED chip 20 is achieved via a first block 28 having good thermal conductivity and made of copper zirconium (or some other material having good thermal conductivity), the front end of which is adhesively bonded to the lower side of board 22, and the rear end to the cold side of a Peltier element 30. The high thermal conductivity of first block 28 and the Peltier element 30 used (having a cooling/heating capacity of for example several ten watts)

allow the desired temperature at the LED chip 20 to be quickly set in a range between +5° C. and +85° C., preferably above the dew point to avoid formation of condensation, more preferably between +25° C. and +35° C., and most preferably at around +30° C. Furthermore, a temperature sensor 32 is inserted into a hollow space that has been milled in block 28 below the surface that supports board 22. Alternatively, the temperature sensor 32 may also be positioned above board 22 directly next to LED chip 20. It should be as close as possible to LED chip 20, so that the measured temperature matches that of the LED chip 20.

The hot side of the Peltier element 30 is adhesively bonded to the front end of a second block 34 made of copper zirconium (or some other material having good thermal conductivity), onto the rear end of which a heat 36 sink having an enlarged heat exchange surface is screwed. The rear end of the second block is held against the inside wall of the housing of the front housing section 6 by a thermally isolating holder 38. Thus the entire device, comprising diffuser 16, support 14, board 22, LED chip 20, first block 28, Peltier element 30 and second block 34 is only connected to the outer housing via this holder 38, which significantly decreases the amount of heat transferred from the ambient air into the device.

The heat sink 36 passes its heat into the surrounding air at the rear of housing section 8, which is then dispersed into the open air by an electric fan 40 at the rear open end of housing section 8. These measures efficiently carry away the dissipated energy of LED chip 20.

The first block 28 is dimensioned so that the hot side of the Peltier element 30 is sufficiently far from the LED chip 20 to ensure that the heat generated there (corresponding to several watts of dissipated energy that must be conveyed away) is kept at a distance from the LED chip 20, yet close enough to the LED chip 20 to ensure that heat exchange takes place sufficiently quickly (preferably in the millisecond range).

Figure 3:
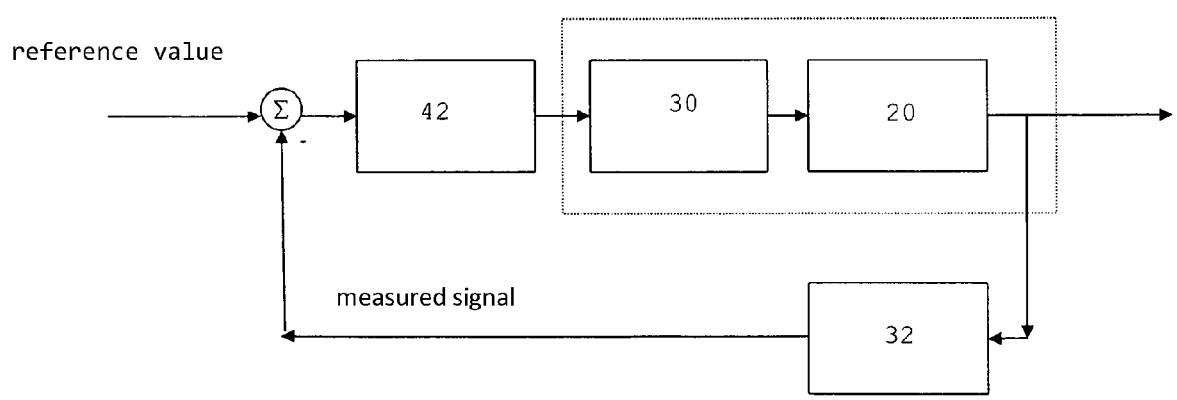
FIG. 3 is a block diagram of temperature control.

For temperature regulation, the measured signal from temperature sensor 32 is sent to a (PID) regulator 42, which compares the measured temperature with a predefined temperature value (reference value), as schematically shown in FIG. 3. As a function of the result of this comparison, the regulator 42 increases or decreases the electrical power supplied to the Peltier element 30. To accomplish this, the temperature sensor 32 and the Peltier element 30 are electrically connected to the regulator 42 via connectors (not shown). The regulator parameters of the regulator 42 are specified to allow adjustment precision of for example 0.01° C.

As the high-powered LED 18 is housed in the plastic housing 4 having low thermal conductivity, ambient temperature changes are diminished sufficiently to ensure regulation is carried out with adequate precision and speed. Without such a housing, the cooling path from LED chip 20 to Peltier element 30 would be too slow to allow disruptive influences to be counteracted rapidly. Because the light exit opening 15 (and the diffuser 16) are mechanically and thermally decoupled from the exterior housing 4, and because they are rigidly mounted on the LED chip 20, the temperature-related changes in the length of the external housing 4 do not affect the distance between the light exit opening 15 (and the diffuser 16) and the high-powered LED 18, and thus do not affect the luminous flux emitted by the calibration radiation source 2. Thanks to this, the required luminous flux stability of less than 0.1% at an ambient temperature of 20°-30° C. can be achieved. Support element 14 is suspended from external housing 4 in such a way that the flow of force between these two elements passes via the board 22, the first block 28, the Peltier element 30, the second block 34 and the heat sink 36.

A light source stabilized in this manner may be used as a transfer standard for various photometric and radiometric values. Typical values are total luminous flux, total radiant power, and averaged LED intensity per CIE 127:2007.

Figure 4:
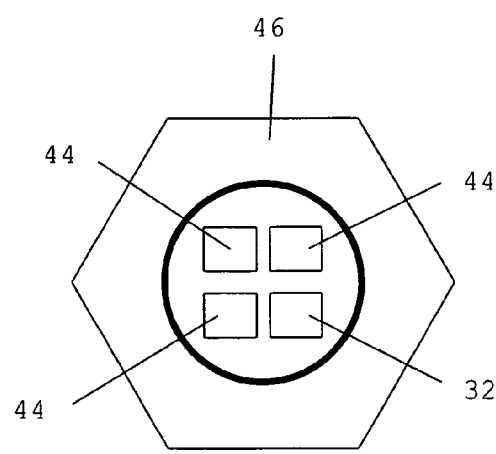
FIG. 4 is a schematic view of an alternative embodiment of the high-powered LED.

FIG. 4 shows an alternative embodiment of the high-powered LED 18 in the form of a chip array 46 arranged on board 22 comprising three differently-colored high-powered LED elements 44, with which colors can be mixed to produce any desired color, and a temperature sensor 32.

Instead of the high-powered LED 18, a standard or high brightness LED may also be used. The Peltier element 30 may then heat the LED temperature to a constant value that is above the ambient temperature, for example 40° C. Instead of the Peltier element 30, the LED may also be heated directly via its bonding wires, which are arranged as resistance heating elements. Alternatively, no active temperature stabilization is provided. In this case, the temperature stabilizes itself independently to a temperature value after a certain time if a constant forward voltage $U_F$ is reached. The electrical power consumed, and thus the luminous output emitted and the dissipated power, are then also stable. As an alternative to the constant current described, the LED may also be operated with variable current. In this case, the current modulation results in temperature fluctuation. The LED may be supplied with a high pulsed current, which is switched on and off periodically. An OLED (organic light emitting diode) or a semiconductor laser may also be used as a semiconductor radiation source.

The applicant reserves the right to seek separate protection for the idea of temperature stabilization of a calibration radiation source having a high-powered LED 18 at constant current, independently from the concept of decoupling the light exit opening 15 from the external housing 2.

It is claimed:
1. A calibration light source comprising:
a housing (4) having an opening (12),
a board (22) held in the housing (4),
a semiconductor light source (18) held by the board (22), the semiconductor light source to generate a light beam,
an exit opening support element (14) having, in an area of the opening (12), a light exit opening (15), functioning as an aperture through which the light beam generated by the semiconductor light source (18) radiates outwards from the housing (4),
an active cooling device (30) connected to the board (22), the active cooling device to cool the semiconductor light source (18),
a first thermally conductive connecting element (28) connecting a cold side of the cooling device (30) with the board (22) of the semiconductor light source (18) to convey heat away from the semiconductor light source (18) and to the cooling device (30), a thermally isolating holder (38),
a second thermally conductive connecting element (34) connected to a hot side of the cooling device (30), the second connecting element (34) held in the housing (4) by a thermally isolating holder (38),
wherein the active cooling device (30), the first thermally conductive connecting element (28) the exit opening support element (14) and the semiconductor light source (18) are suspended in the housing via the thermally isolating holder in an area adjacent to a portion of the second connecting element (34) toward an end opposing the active cooling device (30), wherein the exit opening support element (14) is attached to the board (22) of the semiconductor light source (18), and wherein a gap (13)

is provided between a sidewall of the exit opening support element (14) and an inner edge of the opening (12).

2. The calibration light source of claim 1 wherein the light exit opening (15) includes a diffuser (16).

3. The calibration light source of claim 1 wherein the semiconductor light source (18) comprises a high-powered LED.

4. The calibration light source of claim 1
wherein the first connecting element (28) is dimensioned so that the hot side of the cooling device (30) is sufficiently far from the semiconductor light source (18) to ensure that the heat generated there is kept at a distance from the semiconductor light source (18), yet close enough to the semiconductor light source (18) to ensure that heat exchange between the cooling device (30) and the semiconductor light source (18) takes place sufficiently quickly.

5. The calibration light source of claim 4 further comprising:
a heat sink (36) attached to the end of the second connecting element (34) at an end opposing the cooling device (30) having an enlarged heat exchange surface to disperse the heat into ambient air, and
a fan (40) to carry heated ambient air away from the heat sink (36).

6. The calibration light source of claim 1, in which the housing (4) and the exit opening support element (14) are made of a material having good heat insulating properties.

7. The calibration light source according to claim 1 further comprising:
a temperature sensor (32) arranged in proximity to the semiconductor light source (18) to measure a temperature of the semiconductor light source (18), and
a temperature regulator (42) to regulate power supplied to the active cooling device (30) as a function of the temperature measured by the temperature sensor (32).

8. The calibration light source of claim 7,
wherein the temperature regulator (42) is set to keep the temperature constant at a fixed specified value.

9. The calibration light source of claim 1 wherein the semiconductor light source (18) comprises a plurality of high-powered LEDs (44) arranged on a chip array (46) with the temperature sensor (32).

10. The calibration light source of claim 1 wherein the active cooling device (30) comprises a Peltier element.

11. The calibration light source according to claim 1 wherein the exit opening support element (14) is a hollow body having a closed sidewall and an open light exit opening (15).

12. The calibration light source of claim 1 wherein the gap is filled with a thermally insulating air buffer.

13. The calibration light source of claim 1 wherein an optically transparent window made of an optically transparent material is provided in light exit opening (15).

14. The calibration light source of claim 13 wherein the optically transparent material is glass or quartz.

* * * * *

UNITED STATES PATENT AND TRADEMARK OFFICE
CERTIFICATE OF CORRECTION

PATENT NO.           : 8,998,453 B2
APPLICATION NO.      : 13/322396
DATED                : April 7, 2015
INVENTOR(S)          : Thomas Nägele et al.

It is certified that error appears in the above-identified patent and that said Letters Patent is hereby corrected as shown below:

Title page

Item (12), replace "Näegele" with --Nägele--

Item (75), Inventors: replace "Wörntzweg" with --Kaufering--

Item (73), Assignee: replace "Instrument Systems Optische Meßtechnik GmbH" with --Instrument Systems Optische Messtechnik GmbH--

Item (73), Assignee: replace the city name from "Munich" with --München--

Signed and Sealed this
Thirteenth Day of October, 2015

Michelle K. Lee
*Director of the United States Patent and Trademark Office*